United States Patent [19]

Rogers

[11] 4,167,965
[45] Sep. 18, 1979

[54] INTEGRAL WATER-REFRIGERANT-AIR HEAT EXCHANGE SYSTEM

[75] Inventor: Richard D. Rogers, E. Syracuse, N.Y.

[73] Assignee: Carrier Corporation, Syracuse, N.Y.

[21] Appl. No.: 817,945

[22] Filed: Jul. 22, 1977

[51] Int. Cl.² .................................................. F28D 7/06
[52] U.S. Cl. ........................................ 165/1; 165/62; 165/104 S; 165/140; 237/1 A; 237/2 B
[58] Field of Search ............... 165/29, 58, 62, 140; 237/1 A, 2 B; 62/2, 238

[56] References Cited

U.S. PATENT DOCUMENTS

| | | | |
|---|---|---|---|
| 2,747,381 | 5/1956 | Lazar | 62/128 |
| 3,253,651 | 5/1966 | Larson | 165/122 |
| 3,523,575 | 8/1970 | Olivieri | 165/22 |
| 3,996,759 | 12/1976 | Meckler | 62/2 |

Primary Examiner—Albert W. Davis, Jr.
Assistant Examiner—Margaret A. Focarino
Attorney, Agent, or Firm—J. Raymond Curtin; John S. Sensny

[57] ABSTRACT

A heat transfer system for effecting heating and cooling at maximum system operating cost efficiency in both modes of operation. In a preferred embodiment, a solar collector is utilized to transfer radiant heat from the sun to a heat storage medium, such as water, which is circulated through a water coil of an indoor heat exchanger. A conventional heat pump has an indoor refrigerant coil supported in the same heat exchanger in thermal contact with the water coil. During heating or cooling, air is passed through the heat exchanger and the heat pump is used to supplement the circulating water when the water is insufficient for heating or cooling purposes.

The heat exchanger is formed by interpositioning the water carrying coil and the refrigerant carrying coil in thermal contact with each other through the use of common coil fins for the separate fluid carrying conduits. The interpositioning of the fluid carrying conduits using common coil fins permits selective heat tranfer between either or both of the heat exchange fluids and the common coil fins when air is circulated through the heat exchanger, as well as to permit heat transfer between the heat exchange fluids when the fluids are circulated through the coils without air being circulated through the heat exchanger.

During lower cost electrical rate periods, such as during off-peak loading, or to take advantage of time-of-day power rates, the heat pump is utilized to transfer heat to or from the heat storage medium for later use during periods of higher electrical energy costs. The exchange of heat between the refrigerant and the storage medium during periods of lower cost electrical energy allows the storage medium to be circulated through the heat exchanger to supplement the heating and cooling operation of the heat pump during time periods when power is more expensive.

12 Claims, 4 Drawing Figures

U.S. Patent  Sep. 18, 1979  4,167,965
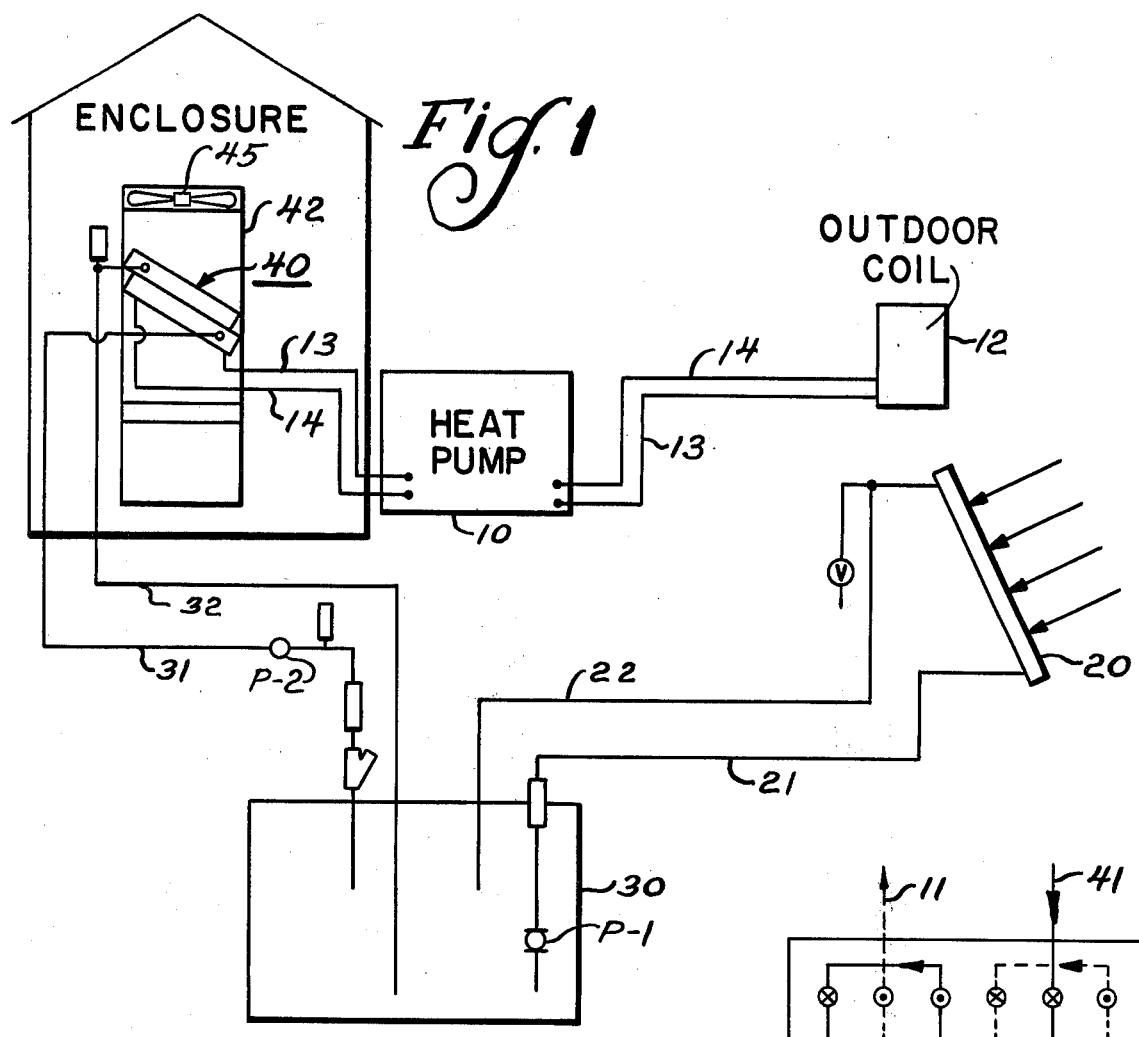
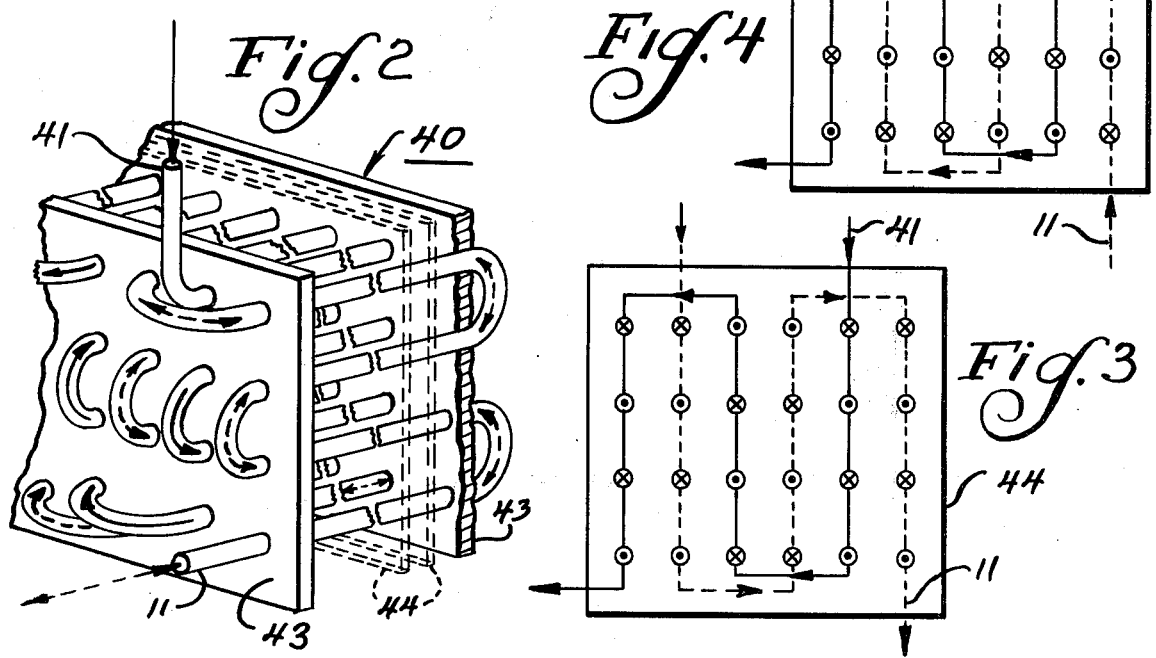

INTEGRAL WATER-REFRIGERANT-AIR HEAT EXCHANGE SYSTEM

BACKGROUND OF THE INVENTION

This invention relates, in general, to heat transfer systems and, in particular, to a heat transfer system for transferring heat between a refrigerant and a heat storage medium to minimize operating costs of the system.

More specifically, but without restriction to the particular use which is shown and described, this invention relates to a heat transfer system wherein the indoor coil of a heat pump is in thermal contact with a heat storage medium forming a common heat exchanger to effect heat transfer between the components of the system.

As is well known to those skilled in the art of heat transfer, heat pumps function to move heat from one location to another. During cold weather, heat, which has already been produced outdoors by the sun and stored in the earth and air, is transferred to a heat-exchange fluid by an outdoor coil and carried indoors. In warm weather, the cycle is reversed. Warm air indoors is circulated about an indoor coil so that the heat from the indoor air is absorbed to the heat-exchange fluid, generally referred to as a refrigerant, which is then carried outdoors to the outdoor coil releasing the heat to the surrounding air.

Since a heat pump moves heat between the indoors and the outdoors, the system does not consume as much energy as a heating system that heats the indoors by heat generation. To further increase system efficiency, heat pumps are sometimes combined with other types of heat transfer systems such as solar collectors. The solar collectors transfer radiant heat from the sun to a heat storage medium, such as water, which is circulated through a finned coil in heat exchange contact with air passing over the fin surfaces. In such systems, if the heat transferred to the heat storage medium through the solar collectors is insufficient for heating purposes, the heat pump is energized to supplement the heat supplied from the storage medium. During cooling, the heat pump performs in a conventional manner by circulating refrigerant through a finned indoor coil in heat exchange contact with air being circulated over the fin surfaces of the coil.

Such combined heat transfer systems serve to reduce the overall cost of heating by utilizing the heat transferred through the solar collectors to the storage medium for heating purposes. However, due to variation in the amount of heat transferred to the storage medium through the solar collectors, such systems have not been entirely satisfactory. For example, if the amount of heat transferred to the storage medium through the solar collectors is frequently less than that required for heating purposes, the heat pump must be continuously operated to obtain the desired heating. In addition, such combined systems do not improve the efficiency of the heat transfer systems during cooling operation and do not provide for heat transfer between the heat pump coil and the heat storage medium.

SUMMARY OF THE INVENTION

It is, therefore, an object of this invention to improve heat transfer systems.

Another object of this invention is to transfer indoor/outdoor heat between a heat transfer system and/or heat storage medium as well as between the heat transfer system and the heat storage medium.

A further object of this invention is to obtain maximum heat transfer system operating cost efficiency by operatively connecting the indoor coil of a heat pump to a heat storage medium for minimizing the operating costs of the system during heating and cooling.

These and other objects are attained in accordance with the present invention wherein there is provided a heat pump having its indoor coil in thermal contact with the coil of a heat storage medium such that heat may be transferred from the heat pump coil to air, from the storage medium to air, and between the heat pump and storage medium.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a mechanical schematic of a heat transfer system in accordance with the invention;

FIG. 2 is a partial frontal perspective view of a portion of a finned tube heat exchanger to better illustrate the manner in which the indoor coil of the heat pump and the coil of the heat storage medium are inter-positioned;

FIG. 3 is a hydraulic schematic representation of the heat exchanger to illustrate the manner of heat exchange flow through the separate coils forming the heat exchanger when the heat pump is in a heating mode; and FIG. 4 is a hydraulic schematic representation of the heat exchanger to illustrate the manner of heat exchanger fluid flow through the heat exchanger when the heat pump is in a cooling mode of operation.

DESCRIPTION OF THE PREFERRED EMBODIMENT

Referring now to FIGS. 1 and 2, there is shown a mechanical schematic of a heat transfer system constructed in accordance with the invention. The disclosed system comprises, generally, a heat pump 10, a solar collector 20, and a storage tank 30 for containing a heat storage medium such as water. While a preferred embodiment of the invention uses water as the heat storage medium, it should be understood that any suitable heat storage medium may be employed with the invention. Also, while a preferred embodiment of the invention is used in combination with a solar collector, it is to be understood that such a solar collector is not necessary to the invention. Other types of heat transfer systems can be combined with the heat pump-heat storage system to be hereinafter described in detail, or the heat pump-heat storage system can be used alone to obtain the benefits, objectives and advantages disclosed herein.

The heat pump 10 has an indoor coil 11, supported in a heat exchanger 40, and an outdoor coil 12 coupled thereto in a conventional manner by refrigerant supply and return lines 13 and 14, respectively. The solar collector 20 is in thermal contact with water in the storage tank 30 by means of water supply and return lines 21 and 22, respectively. A conventional pump P-1 is used to circulate water between the solar collector 20 and the storage tank 30 to transfer heat therebetween in a manner known to those skilled in the art. The water in the storage tank 30 is circulated by a pump P-2 from the storage tank 30 through a water coil 41, carried in the heat exchanger 40, by a water supply line and a water return line, 31 and 32, respectively. The structure and function of the heat exchanger 40, which carries the water coil 41 and the indoor coil 11 of the heat pump will be described in greater detail hereinafter.

In order to better illustrate the manner in which the present invention functions, the heat pump-heat storage system will be described for both heating and cooling an enclosure. In the heating mode of operation, pump P-1 is actuated so that the solar collectors 20 transfer radiant heat from the sun to the water contained in the storage tank 30. To heat the enclosure, pump P-2 is energized to draw the heated water through the water supply line 31 for circulation through the water coil 41 of the heat exchanger 40. The heat exchanger 40 is carried in a plenum 42 adjacent a suitable fan 45 which is energized to pass air through the heat exchanger 40 while the heated water is returned to the storage tank 30 through return line 32. Heated water circulated through the water coil 41 is in heat transfer relationship with the air passing thereover to effect heating of the enclosure in response to a thermostatic control (not shown) connected to control the heat transfer system in a manner known to those skilled in the art. Heat transferred from the solar collector 20 which is not needed for immediate heating purposes is stored in the water of the storage tank 30 for later use.

If the heat transferred by the solar collector 20 to the water contained in the storage tank 30 is not sufficient for indoor heating requirements, the heat pump 10 is energized to transfer heat from the outdoors to the indoors by circulation of the heat pump refrigerant through the indoor coil 11 in a manner utilized in commercially available heat pumps. As is apparent, both the refrigerant from the heat pump 10 and the water from the storage tank 30 can be circulated separately or in combination to transfer heat from the outdoors to the enclosure by circulating air through the heat exchanger 40 as required by the thermostatic control.

To lower system operating cost, such as by obtaining the benefits of time-of-day rates for electrical power consumption, the heat pump 10 can be utilized to store heat for later use by transferring the heat absorbed by the outdoor coil 12 to the storage medium in the tank 30. In order to transfer heat between the two heat exchange fluids, the heat exchanger 40, best illustrated by FIGS. 2, 3 and 4, is formed by interpositioning the indoor coil 11 of the heat pump with the water coil 41 coupled to the storage tank 30. The indoor coil 11 is passed between two tube sheets 43 and the refrigerant circulated through the coil in either direction (as indicated by the dashed arrow) depending upon the particular mode of operation of the heat pump to effect heating (FIG. 3) or cooling (FIG. 4) of the enclosure. The water coil 41 is supported by the same two tube sheets 43 to circulate the water from the storage tank 30, as indicated by a solid arrow, through the water coil. The coils 11 and 41, are each supported by the tube sheets 43 in alternate vertical parallel planes and carry a plurality of common coil fins 44 throughout the length of the coils extending between the two tube sheets 43.

In order to transfer heat from the refrigerant circulated through the indoor coil 11 of the heat pump 10 to the water circulated through the water coil 41, air flow from the fan is stopped while the heat pump 10 and water pump P-2 are operating. As shown in FIG. 3, wherein the conventional flow symbols of ⊗ and ⊙ are used to indicate flow into and out from the plane of the figure, respectively, the flow path of the two heat exchange fluids will be in parallel. Heat will then be transferred from the outdoors to the heat storage medium for storage until such time as it is needed, or for later use during time periods when energy costs for running the heat pump 10 are at a higher level.

During cooling of the enclosure, the heat exchanger fluids are in counter-flow as illustrated by FIG. 4, wherein the same flow symbols as shown in FIG. 3 are utilized. The refrigerant in the heat pump 10 and/or the water in the storage tank 30 are circulated through their respective coils, 11 and 41, of the heat exchanger 40 under control of the thermostat control system. If the temperature of the water in the storage tank 30 is such that heat will be extracted from the enclosure to the water, pump P-2 is energized circulating water through the coil 41 while the fan passes air through the heat exchanger 40 in heat transfer relationship with the water passing through the finned coil. Refrigerant is circulated through the indoor coil 11 by the heat pump 10 to extract heat from the enclosure to the outdoors to supplement the heat extracted by the water coil, as necessary.

Again, similarly to transferring heat to the storage medium, heat can be extracted from the heat storage medium by the heat pump 10 during those times of the day when energy rates for operating the heat pump are the lowest. Transferring heat from the storage medium during low cost energy periods allows the water to be circulated through the water coil 41 of the heat exchanger 40 during higher energy cost time periods to supplement or supplant use of the heat pump 10 to cool the enclosure. In extracting heat from the storage medium, the fan is again not operated to pass air through the heat exchanger 40, but is deenergized while the heat exchange fluids are circulated through their respective coils, 11 and 41, to transfer heat between the two mediums.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat transfer and storage system for maintaining a temperature within an enclosure comprising:
   a compressor for compressing vaporous refrigerant;
   an outdoor heat exchange coil located outside the enclosure;
   a refrigerant expansion device;
   refrigerant flow reversing means;
   heat storage means for storing a heat transfer fluid;
   a three medium heat exchanger located within the enclosure and including a first heat exchange coil, a second heat exchange coil, heat transfer means thermally connecting the first and second heat exchange coils, and means to pass ambient air over the first and second coils;

first connecting means connecting the compressor, the outdoor heat exchange coil, the refrigerant expansion device, the refrigerant flow reversing means, and the first heat exchange coil to form a reversible, vapor compression refrigeration system for transferring heat between the outdoor coil and the three medium heat exchanger; and second connecting means connecting the heat storage facility and the second heat exchange coil of the three medium heat exchanger, wherein the heat transfer fluid circulates and transfers heat between the heat storage facility and the three medium heat exchanger.

2. The apparatus of claim 1 wherein said heat storage means comprises a reservoir of water.

3. The apparatus of claim 2 further including means for transferring radiant heat from the sun to said reservoir of water.

4. The apparatus of claim 2 wherein the second heat exchange coil of the three medium heat exchanger includes a water coil for circulating water from the reservoir through the three medium heat exchanger.

5. The apparatus of claim 4 wherein the heat transfer means of the three medium heat exchanger comprises a plurality of heat transfer fins connected in heat exchange relation with the first coil and the water coil of the three medium heat exchanger.

6. A method of heating or cooling an enclosure comprising the steps of:

operating a heat pump to transfer heat between an indoor heat exchange coil located within the enclosure and an outdoor heat exchange coil located outside of the enclosure;

transferring heat between the indoor coil and the enclosure by passing ambient air over the indoor coil;

storing heat transferred between the indoor coil and the outdoor coil by circulating a heat storage medium between a heat storage facility and a heat storage medium coil located in thermal contact with the indoor coil; and transferring stored heat between the heat storage facility and the enclosure by circulating the heat storage medium between the heat storage facility and the heat storage medium coil and passing ambient air over the heat storage medium coil.

7. The method of claim 6 wherein heat is transferred to the enclosure simultaneously from the heat pump indoor coil and the heat storage medium coil by the passing of air thereover while the heat pump is operated and the heat storage medium is circulated through the coil.

8. The method of claim 6 wherein heat is transferred from the storage medium coil without simultaneously being transferred from the indoor coil by passing air over said coils while interrupting operation of the heat pump.

9. The method of claim 8 further comprising the step of supplying auxiliary heat to the heat transfer medium.

10. The method of claim 9 wherein the step of supplying auxiliary heat includes the step of transferring radiant heat from the sun to the heat transfer medium.

11. A heat transfer and storage system for maintaining a temperature within an enclosure comprising:

a three medium heat exchanger including a first heat exchange coil, a second heat exchange coil, heat transfer means thermally connecting the first and second coils, and means to pass ambient air over the coils;

a heat pump of the type having an indoor coil located within the enclosure and an outdoor coil located outside the enclosure, wherein the indoor coil is the first coil of the three medium heat exchanger;

a heat storage means for storing a heat transfer fluid; and connecting means connecting the heat storage means and the second coil of the three medium heat exchanger, wherein the heat transfer fluid circulates and transfers heat between the heat storage means and the three medium heat exchanger.

12. A heat transfer and storage system as defined by claim 11 wherein:

the heat transfer means of the three medium heat exchanger, includes a plurality of heat transfer fins in thermal contact with the ambient air, the first heat exchange coil, and the second heat exchange coil; and further including means to transfer radiant heat from the sun to the heat transfer fluid.

* * * * *

Notice of Adverse Decision in Interference

In Interference No. 100,901, involving Patent No. 4,167,965, R. D. Rogers, INTEGRAL WATER-REFRIGERANT-AIR HEAT EXCHANGE SYSTEM, final judgement adverse to the patentee was rendered Dec. 31, 1984, as to claims 1–4, 6 and 11.

[*Official Gazette September 17, 1985.*]